United States Patent Office 3,527,818
Patented Sept. 8, 1970

3,527,818
OXO ALCOHOLS USING CATALYSTS COMPRISING DITERTIARY PHOSPHINES
Ronald F. Mason, Mill Valley, and John L. Van Winkle, San Lorenzo, Calif., assignors to Shell Oil Company, New York, N.Y., a corporation of Delaware
No Drawing. Original application Nov. 26, 1965, Ser. No. 510,068, now Patent No. 3,401,204, dated Sept. 10, 1968. Divided and this application June 5, 1968, Ser. No. 782,776
Int. Cl. C07c 29/16; C07f 15/06
U.S. Cl. 260—632                     5 Claims

ABSTRACT OF THE DISCLOSURE

The novel bicyclic heterocyclic ditertiary phosphines, hydrocarbylenebis - (monophosphabicyclononanes), are used in the selective direct, single-stage production of reaction products consisting predominantly of primary alcohols by reacting an olefinic compound with carbon monoxide and hydrogen at a temperature between about 100° and 300° C. and superatmospheric pressure in the presence of a catalyst of cobalt in complex combination with carbon monoxide and hydrocarbylene-bis(monophosphabicyclononane).

---

This is a division of applicants' copending application Ser. No. 510,068, filed Nov. 26, 1965, now U.S. Patent No. 3,401,204.

This invention relates to certain heterocyclic phosphines, their production, organometallic-carbonyl complexes thereof and to the use of the complexes as catalysts. More particularly, it relates to a novel class of bicyclic heterocyclic ditertiary phosphines, to their preparation, to novel complexes thereof with organometallic-carbonyl compounds, and to the use of said complexes as catalysts in the production of primary alcohols.

Certain diphosphabicyclooctanes and analogs thereof have been reported. R. C. Hinton and F. G. Mann, J. Chem. Soc. 1959, 2835, have disclosed the reduction of 1,4-dibenzyltriethylenediphosphonium bromide with lithium aluminum hydride to product a small amount of 1,4-diphosphabicyclo[2.2.2]octane. C. G. Krespan in U.S. 2,996,527 disclosed 2,3,5,6,7,8-hexakis(polyfluoroalkyl)-1,4-diphosphabicyclo[2.2.2]octa - 2,5,7 - trienes and their preparation by heating red phosphorus with bis(polyfluoroalkyl)acetylenes and a catalytic amount of iodine.

It is an object of the present invention to provide a novel class of diphosphorus-containing polycyclic organic compounds and methods for the production thereof. A more particular object is to provide novel α,ω-hydrocarbylene - P,P' - bis(monophosphabicyclononanes) in which ring systems (a) each phosphorus atom is a member of a bridge linkage, (b) each phosphorus atom is not in a bridgehead position, and (c) each phosphorus atom is not a member of the bicyclic system of the other. A further object is to provide novel catalysts comprising cobalt in complex combination with carbon monoxide and such bicyclic ditertiary phosphines for use in hydroformylating olefins.

It has now been found that these objects are accomplished by processes which comprise the reaction of certain phosphines with suitable polyolefinic compounds. Such processes provide the desired ditertiary phosphines directly either from a secondary phosphine or, alternatively, from a diprimary phosphine.

The novel compounds of the invention comprise bicyclic heterocyclic ditertiary phosphines. They are hydrocarbylene - connected monophosphabicyclononanes in which the smallest phosphorus-containing rings contain at least five atoms, and the phosphorus atom therein is a member of a bridge linkage but is not a bridgehead atom. In addition to the hydrocarbylene substitution on the phosphorus atoms, the ring carbons may also be substituted. However, it is preferred that such C-substituents be limited to nonbulky ones. One class of such compounds has from 18 to 50 carbon atoms, preferably from 21 to 40, and is represented by the formula

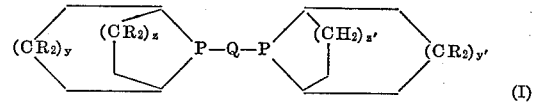

(I)

where Q represents hydrocarbylene; $y$ and $z$ represent positive integers whose sum is 3 and each of which has a minimum value of 1; $y'$ and $z'$, independent of the values of $y$ and $z$, represent positive integers whose sum is 3 and each of which has a minimum value of 1; and R represents hydrogen and lower alkyl of from 1 to 4 carbon atoms, such as methyl, ethyl, propyl, and butyl. It is preferred that no more than two R groups in each bicyclic system be alkyl at any one time and that each of these be attached to a different ring carbon. It is to be understood that in the foregoing graphic formula and those appearing hereinafter the line portion of the structure represents a conventional organic chemical covalent bond with saturated carbon atom at each indicated intersection, the saturation being by the required number of hydrogen atoms or lower alkyl radicals.

The term "hydrocarbylene" is used in its accepted meaning as representing a diradical formed by removal of one hydrogen atom from each of two different carbons of a hydrocarbon. The hydrocarbylene groups represented by Q in the formula above may be any nonacetylenic acyclic or cyclic organic radical composed solely of carbon and hydrogen. Wide variation is possible in that the (nonacetylenic) acyclic or cyclic hydrocarbylene group may be alkylene, alkenylene, aralkylene, cycloalkylene, straight chain, branched chain, large or small. Representative hydrocarbylene groups include ethylene, trimethylene, tetramethylene, butylene, pentamethylene, pentylene, methylpentylene, hexamethylene, hexenylene, ethylhexylene, dimethylhexylene, octamethylene, octenylene, cyclooctylene, methylcyclooctylene, dimethylcyclooctylene, isooctylene, dodecamethylene, hexadecenylene, octadecamethylene, eicosamethylene, hexacosamethylene, triacontamethylene, phenylenediethylene, and the like. A particularly useful class of bicyclic heterocyclic ditertiary phosphines is that containing only carbon, hydrogen, and phosphorus atoms. Substituted hydrocarbylene groups are also contemplated and may contain a functional group such as the carbonyl, carboxyl, nitro, amino, hydroxy (e.g. hydroxyethyl), cyano, sulfonyl, and sulfoxyl groups. A particularly useful group of ditertiary phosphines consists of those in which Q is hydrocarbylene of from 2 to 30 carbon atoms; especially preferred are those in which Q is hydrocarbylene of from 5 to 20 carbons.

Hence, a preferred group of bicyclic heterocyclic ditertiary phosphines includes those represented by Formula I where Q represents hydrocarbylene of 2 to 30 carbons and especially of 5 to 20; $y$ and $z$ represent positive integers whose sum is 3 and each of which has a minimum value of 1; $y'$ and $z'$, independent of the values of $y$ and z, represent positive integers whose sum is 3 and each of which has a minimum value of 1; and R represents hydrogen and alkyl of from 1 to 4 carbons such that no more than two R groups in each bicyclic system is alkyl at any one time and that each of said alkyl groups is attached to a different ring carbon.

It is sometimes desirable to balance the size of the substituents in the aforedescribed ditertiary phosphines. When the R substituents are relatively large, e.g. butyl, it may be desirable to choose a smaller Q. Conversely, when Q is large, e.g. eicosamethylene or triacontamethylene, it may be desirable that the R substituents be smaller and/or less numerous, such as methyl or dimethyl in each bicyclic system. Particularly useful compounds are those in which the sum of R and Q is no greater than 34 carbon atoms and those in which the total number of carbon atoms is no greater than 50.

The bicyclic ditertiary phosphines of the invention are produced by reacting certain phosphines with suitable polyolefinic compounds in the presence of a free radical-generating catalyst and in the absence of substantial amounts of oxygen. In a preferred method, they are produced by reacting a bicyclic heterocyclic secondary phosphine with a polyolefinic (acyclic or cyclic) compound containing at least two isolated (nonconjugated) ethylenic linkages in the presence of a free radical-generating catalyst and in the absence of substantial amounts of oxygen.

Particularly useful bicyclic heterocyclic secondary phosphines are the 9-phosphabicyclononanes in which the smallest phosphorus-containing ring contains at least 5 atoms; they are described in copending U.S. application of R. F. Mason and J. L. Van Winkle, Ser. No. 468,572, filed June 30, 1965 and now U.S. Pat. No. 3,400,163. Representative of such secondary phosphines are 9-phosphabicyclo [4.2.1] nonane, 9 - phosphabicyclo [3.3.1] nonane, 3,7-dimethyl-9-phosphabicyclo[4.2.1]nonane, 3,7-dimethyl - 9 - phosphabicyclo[3.3.1]nonane, 3,8-dimethyl-9-phosphabicyclo[4.2.1]nonane, 3,8-dimethyl-9-phosphabicyclo[3.3.1]nonane, mixtures thereof, and the like.

The polyolefinic coupling compounds are acyclic and cyclic polyenes containing from 5 to 30 carbon atoms and at least two nonconjugated ethylenic linkages. The required two ethylenic linkages may be terminal or internal; one of them may be conjugated with a third double bond not conjugated with respect to the other one. A preferred group of polyenes includes dienes in which the unsaturation is located in terminal positions, such as $\alpha,\alpha'$-diolefins and, for example, the $\beta,\beta'$-dialkyl-$\alpha,\alpha'$-diolefins. Representative polyenes include 1,4-pentadiene, 1,5-hexadiene, 2,5-dimethyl - 1,5 - hexadiene, 1,7 - octadiene, 1,3,7 - octatriene, 1,5 - cyclooctadiene, 3,7-dimethyl-1,5-cyclooctadiene, 3,8-dimethyl-1,5-cyclooctadiene, divinylbenzene, 1,11-dodecadiene, 2,11-dimethyl-1,11-dodecadiene, 1,19-eicosadiene, 1,29-triacontadiene, and the like.

The reaction is carried out with the aid of a free radical-generating catalyst, such as an azonitrile, or a dialkyl or diacyl peroxide. The term "free radical-generating catalyst" is also meant to include actinic radiation, particularly ultraviolet light, and high energy or ionizing radiation such as use of cobalt-60, a source of high energy $\gamma$ or X rays. The azonitrile catalysts which may be employed in this reaction are well known in the art and include $\alpha,\alpha'$-azobisisobutyronitrile, $\alpha,\alpha'$-azobis($\alpha$-methylbutyronitrile), $\alpha,\alpha'$-azobis($\alpha$-methylisocapronitrile), and the like. Suitable peroxide catalysts include the dialkyl peroxides such as di-t-butyl peroxide, and the diacyl peroxides such as butyryl, lauroyl and benzoyl peroxides. The amount of catalyst which may be used may vary over a wide range from 0.1% by weight upward. From 0.5 to 5% by weight of catalyst, based on the weight of the secondary phosphine reactant, is ordinarily desirable. The azonitrile catalysts represent a preferred class of catalysts owing to their utility at lower temperatures.

The two reactants may be used in stoichiometric amounts or in a slight molar excess of one reactant or the other. Thus two moles of bicyclic secondary phosphines may be used for each mole of polyene. In a preferred mode of operation, at least a 10% excess of the secondary phosphine over the stoichiometric amount is used to maximize the yield of desired ditertiary phosphine formed over that of the by-product monotertiary phosphine. The reaction may be conducted in the presence of a nonreactive solvent medium such as aliphatic cyclic and acyclic saturated hydrocarbons, e.g. pentane, n-hexane, cyclohexane, petroleum ether, isooctane, and the like. It is sometimes desirable, for example, when the molecular weights of the reactants are low, to conduct the reaction in the presence of one of the aforesaid solvents in order to dilute the reactants, thereby minimizing polymerization of the unsaturated reactant. Such solvents also aid in dissipating the heat generated in this exothermic reaction. The mixture and its environment should be free of substances, such as oxygen and air, capable of converting the desired bicyclic heterocyclic ditertiary phosphines to the corresponding compounds of a higher oxidative state, e.g. phosphine oxides. Hence, the reaction should be conducted in an inert atmosphere such as under nitrogen or, when the reactants are sufficiently high boiling, under vacuum. If desired, small amounts of oxidation inhibitors optionally may be added.

The temperature at which the reaction should be conducted will be governed by the specific catalyst employed in that a useful temperature is one at which the free radical-generating catalyst decomposes or furnishes free radicals at a moderately even rate throughout the course of the reaction. For example, when the free radical-generating catalyst is actinic radiation, particularly ultraviolet light, ambient room temperature is sufficient. When $\alpha,\alpha'$-azobisisobutyronitrile is the catalyst, a temperature of about 70° C., conveniently obtained by conducting the reaction in refluxing n-hexane, is sufficient. On the other hand, when the free radical-generating catalyst is a dialkyl peroxide, temperatures of 110–150° C. will be desired in order to decompose smoothly the peroxide. The cyclization may be carried out at any temperature short of the rapid decomposition point of any of the catalysts used. The lower temperature limit is that at which the coupling becomes impractical. Temperatures from —10° to 200° C. may be used, the preferred range ordinarily being from room temperature (15° C.) to about 175° C. The reaction will usually be carried out at just above atmospheric pressure, although higher or lower pressures may be used, with due consideration given to the physical properties of the reactants, e.g. volatility and the like, as mentioned previously.

An alternative preparative method comprises reacting a diprimary hydrocarbylene phosphine with a cyclooctadiene, in which the unsaturation is neither conjugated nor homoconjugative, in the presence of a free radical-generating catalyst and in the absence of substantial amounts of oxygen. Representative examples of these cyclooctadienes include 1,5-cyclooctadiene, 3,7-dimethyl-1,5-octadiene, 3,8-dimethyl-1,5-octadiene, and the like. The diprimary hydrocarbylene phosphine useful herein has the formula $H_2P$—Q—$PH_2$ wherein Q is as already defined. Ethylene diphosphine (unstable above —78° C.), trimethylene diphosphine, tetramethylene diphosphine, butylene diphosphine, and the like, are particularly useful, especially for preparing compounds of formula I wherein Q is lower hydrocarbylene of 2-4 carbons. Treatment of alkali metal phosphides with alkylene dihalides produces diprimary alkylene phosphines (see for example, L. Maier in "Progress in Inorganic Chemistry," vol. 5, 35, Interscience Publishers (J. Wiley and Sons, New York, 1963). When Q contains 5 or more carbons, the preferred process for preparing (I) is from secondary phosphine and acyclic or cyclic polyenes as previously described above.

It will be apparent from the preceding discussion that a variety of substituted and unsubstituted hydrocarbylene-bis (monophosphabicyclononanes) may be produced. In the nomenclature of such compounds, as well as the reactants employed for the production thereof, conventional numbering of the ring systems has been employed, as further illustrated by the following formulas:

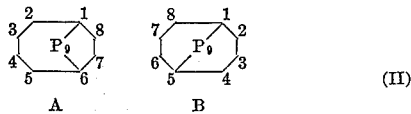

(II)

Typical products of the process of the invention, numbered according to this system, include α,ω-hydrocarbylene-P,P'-bis(9-phosphabicyclononane) in which the smallest P-containing rings contain at least five atoms, α,ω-hydrocarbylene-P,P'-bis((di)alkyl-9-phosphabicyclononane) in which the smallest P-containing rings contain at least five atoms, α,ω-alkylene-P,P'-bis(9-phosphabicyclo[4.2.1]nonane) α,ω-alkylene-P,P'-bis(9-phosphabicyclo[3.3.1]nonane), α,ω-alkylene-P- 9-phosphabicyclo[4.2.1]nonane)-P'-(9-phosphabicyclo[3.3.1]nonane), octamethylene-P,P'-bis(9-phosphabicyclo[4.2.1]nonane), octamethylene-P,P'-bis(9-phosphabicyclo[3.3.1]nonane) octamethylene-P-(9-phosphabicyclo[4.2.1]nonane) - P' - (9 - phosphabicyclo[3.3.1]nonane), trimethylene - P,P' - bis(3,7-dimethyl-9-phosphabicyclo[4.2.1]nonane, trimethylene-P,P'-bis(3,7-dimethyl-9-phosphabicyclo[3.3.1]nonane), trimethylene-P-(3,7-dimethyl-9-phosphabicyclo[4.2.1]nonane)-P'-(3,7-dimethyl - 9 - phosphabicyclo[3.3.1]nonane), eicosmethylene - P,P' - bis(9 - phosphabicyclo[4.2.1]nonane), eicosamethylene - P,P' - bis(9 - phosphabicyclo[3.3.1]nonane), eicosomethylene - P-(9-phosphabicyclo[4.2.1]nonane)-P'-(9-phosphabicyclo[3.3.1]nonane), mixtures thereof, and the like.

The novel bicyclo heterocyclic ditertiary phosphines of this invention are useful as phosphine ligands for organometallic complex catalysts, particularly in the hydroformylation of olefins to alcohols, as is described in copending U.S. application of R. F. Mason and J. L. Van Winkle, Ser. No. 468,572, filed June 30, 1965, which refers to copending U.S. application of J. L. Van Winkle, R. C. Morris, and R. F. Mason, Ser. No. 468,573, filed June 30, 1965 and now U.S. Pat. No. 3,420,898.

In accordance with the present invention, olefinic compounds may be converted to primary alcohols having one more carbon atom than the olefinic compounds by reacting the olefinic compounds in liquid phase, with carbon monoxide and hydrogen, at a temperature between about 100° and about 300° C. and superatmospheric pressure in the presence of a novel hydroformylation catalyst comprising cobalt in complex combination with carbon monoxide and the novel bicyclic heterocyclic ditertiary phosphines described herein. Suitable and novel hydroformylation catalysts of the invention include the ditertiary phosphine-cobalt-carbonyl complexes wherein the ditertiary phosphine is chosen from novel α,ω-hydrocarbylene-P,P'-bis(monophosphabicyclononanes) in which ring systems (a) each phosphorus atom is a member of a bridge linkage, (b) each phosphorus atom is not in a bridgehead position, and (c) each phosphorus atom is not a member of the bicyclic system of the other, and (d) the smallest phosphorus-containing rings contain at least five atoms. It is to be understood that the suitable novel hydroformylation catalysts may comprise two different bicyclic heterocyclic ditertiary phosphine ligands. A particularly preferred catalyst comprises a cobalt-carbonyl-ditertiary phosphine complex in which the ditertiary phosphine is a mixture of α,ω-alkylene-P,P'-bis(9-phosphabicyclo[4.2.1]nonane), α,ω-alkylene-P,P'-bis(9-phosphabicyclo[3.3.1]nonane), and α,ω-alkylene - P - (9-phosphabicyclo[4.2.1]nonane)-P'-(9-phosphabicyclo[3.3.1]nonane), especially wherein the α,ω-alkylene moiety is octamethylene.

The novel hydroformylation catalysts can be prepared by a diversity of methods which are described in copending U.S. application of J. L. Van Winkle, R. C. Morris, and R. F. Mason, Ser. No. 468,573, filed June 30, 1965. The pertinent portions of Ser. No. 468,573 are incorporated in and made a part of this specification for the purpose of describing these methods in more detail.

In accordance with the invention, olefinic compounds are hydroformylated to reaction products predominating in primary alcohols by intimately contacting the olefinic compound in liquid phase with carbon monoxide and hydrogen in the presence of the above-defined hydroformylation catalysts comprising a complex of cobalt with ditertiary phosphine ligands and carbon monoxide at well defined conditions of temperature and pressure which are described in the above-mentioned copending U.S. application. The pertinent portions of Ser. No. 468,573 are incorporated in and made a part of this specification for the purpose of describing these conditions in more detail.

The ratio of hydroformylation catalyst to the olefin to be hydroformylated is generally not critical and may vary widely. These ratios are described in detail in the aforementioned copending U.S. application Ser. No. 468,573 and the pertient portions thereof are incorporated in and made a part of this specification for the purpose of describing these ratios in more detail.

A signal advantage of the present invention as indicated above and further evidenced by the following examples is the ability to effect the direct, single-stage hydroformylation of the olefins to a reaction mixture wherein primary alcohols predominate over the aldehydes and by-product saturated hydrocarbons. The alcohols obtained from the starting olefins are furthermore generally primarily the straight chain or normal isomers. The various olefinic materials having at least one ethylenic carbon-to-carbon bond and hydroformylated according to the process of this invention are described in detail in the aforementioned copending U.S. application. The pertinent portions of Ser. No. 468,573 are incorporated in and made a part of this specification for the purpose of describing these materials in more detail.

The reaction mixtures obtained may be subjected to suitable catalyst and product separating means comprising one or more such steps, for example, as statification, solvent extraction, distillation, fractionation, adsorption, etc. Catalyst, or components thereof, as well as unconverted charge, may be recycled in part or entirely to the reaction zone.

To further illustrate the novel process of the invention and the novel products obtained thereby, the following examples are provided. It should be understood that they are not to be regarded as limitations, as the teachings thereof may be varied as will be understood by one skilled in the art.

EXAMPLE I

A 500-ml., 4-necked reaction flask fitted with stirrer, thermometer, reflux condenser and nitrogen inlet was purged with nitrogen and charged with 64 grams (0.45 mole) of a mixture of 9-phosphabicyclo[4.2.1]nonane and 9-phosphabicyclo[3.3.1]nonane, 22 grams (0.2 mole) of redistilled 1,7-octadiene, 6.4 grams (0.04 mole) of azobisisobutyronitrile, and 150 ml. of deaerated n-decane. A nitrogen blanket was maintained at all times. The mixture was then heated to 80° C. by immersion in an oil bath and held at this temperature for five hours. A second 3.2-gram (0.02 mole) portion of azobisisobutyronitrile was added and heating continued for an additional 16 hours. The reaction was completed by adding a third 1.6-gram (0.01 mole) portion of azobisisobutyronitrile and heating for another four hours. Total reaction time was 25 hours. Gas-liquid chromatographic analysis indicated a 70% conversion based on secondary phosphine, 9-phosphabicyclanonanes, reacted.

Unreacted 9-phosphabicyclonane was removed by co-distillation with decane solvent in a gentle stream of nitrogen at atmospheric pressure using a 6-inch Vigreaux column. Short path distillation yielded two fractions: (1) 19.3 grams (39%) of monotertiary phosphine, 9-(7-octenyl) - 9 - phosphabicyclo[4.2.1]nonane and 9-(7-octenyl)9-phosphabicyclo[3.3.1]nonane, B.P. 180–190° C. at 0.15 mm. and (2) 43.2 grams (55%) of desired ditertiary phosphine, a mixture of octamethylene-P,P'-bis(9-phosphabicyclo[4.3.1]nonane), octamethylene-P,P'-bis(9-phosphabicyclo[3.3.1]nonane), and octamethylene-P-(9-phosphabicyclo[4.2.1]nonane-P'-(9-phosphabicyclo-[3.3.1]nonane), B.P. 235–245° C. at 0–15 mm. Redistillation gave the analytical sample, B.P. 240° C. at 0–15 mm.

*Analysis.*—Calc'd for $C_{24}H_{44}P_2$ (percent): Basicity (titration with $HClO_4$), 0.51 eq./100 g. Found (percent): Basicity, 0.50 eq./100 g.

EXAMPLE II 47 grams (0.33 mole) of a mixture of 9-phosphabicyclo[4.2.1]nonane and 9-phosphabicyclo[3.3.1]nonane, 18 grams (0.165 mole) of redistilled 1,7-octadiene, and 25 ml. of degassed n-decane were charged to a reaction flask and blanketed with nitrogen. The mixture was heated to 135° C. in an oil bath and thereto was added a solution of 2.4 grams (0.0165 mole) of di-tert-butyl peroxide in 5 ml. of n-decane. After five hours at 150° C. a second 1.2-gram (0.0082 mole) portion of di-tert-butyl peroxide was added and heating continued at 150° C. for a total of 10½ hours.

After removal of n-decane and unreacted 9-phosphabicyclononanes, the mixture was distilled through a 6-inch Vigreaux column. The first fraction obtained yielded 13.3 grams (32%) of monotertiary phosphine, 9-(7-octenyl)-9-phosphabicyclononanes, B.P. 150–180° C. at 0.2 mm. The second fraction obtained yielded 22.9 grams (35%) of desired ditertiary phosphine, a mixture of octamethylene-P,P'-bis(9-phosphabicyclononanes), B.P. 240–251° C. at 0.2 mm.

*Analysis.*—Calc'd for $C_{24}H_{44}P_2$ (percent): Basicity, 0.51 eq./100 g. Found (percent): Basicity, 0.47 eq./100 g.

EXAMPLE III

Cobalt catalysts of cobalt in complex combination with carbon monoxide and the below-indicated phosphine ligands were utilized with 1-dodecene as olefin. The catalysts were prepared in situ, in the equipment to be described, from cobalt octanoate.

The reactor was a 300-ml. stainless steel magnetically stirred autoclave operated at 1250 r.p.m. and connected to a source of a premixed hydrogen-carbon monoxide gas delivered at any desired constant pressure. The phosphine ligand and cobalt octanoate and the olefin, 1-dodecene, were charged to the reactor; the reactor was closed, evacuated, and pressured with $H_2$=CO gas until all foreign gases were displaced. The reactor was then heated under sufficient $H_2$+CO pressure so that the final pressure at reaction temperature was about 1200 p.s.i.g. After the temperature was equilibrated, the pressure reduction was recorded. The reaction conditions and results are tabulated in Table 1.

Run A below, utilizing the bicyclic heterocyclic monotertiary phosphine of copending U.S. application of R. F. Mason and J. L. Van Winkle, Ser. No. 468,572, filed June 30, 1965, was taken as a comparative control. A comparison between Run A and Run B shows that the quantity of desirable primary alkanol product formed when using as ligand the bicyclic heterocyclic ditertiary phosphine of the invention is greater in a shorter reaction time than that formed when using the monotertiary phosphine ligand.

Additional advantages of the ditertiary phosphine ligands, especially as compared to monotertiary phosphine ligands, include (a) higher boiling points resulting in lower volatility and lower rate of loss during hydroformylation processing, (b) less than one-half as much weightwise of ditertiary phosphine ligand as monotertiary phosphine ligand is required, thereby reducing reactor volume requirements and lowering over-all process cost, and (c) their physical characteristics at ambient temperatures, i.e., viscous liquids, rather than solids, resulting in ease of processing.

TABLE 1.—HYDROFORMYLATION OF 1-DODECENE

| Run | A | B |
|---|---|---|
| Phosphine ligand | (1) | (2) |
| Cobalt, percent wt | 0.2 | 0.2 |
| Phosphine/cobalt mole ratio | 1.5 | 1.5 |
| $H_2$/CO mole ratio | 2.1 | 2.1 |
| KOH/cobalt mole ratio | 0.75 | 0.75 |
| Temperature, °C | 183–185 | 182–184 |
| Pressure, p.s.i.g | 1,200 | 1,200 |
| Time required for 99% conversion, hr | 6.0 | 4.9 |
| Conversion of 1-dodecene, percent | 99.0 | 99.4 |
| Conversion to saturated hydrocarbon, percent | 14.3 | 12.1 |
| Conversion to primary alkanols, percent | 84.7 | 87.2 |

[1] Mixture of 9-iicosyl-9-phosphabicyclo[4.2.1]nonane and 9-eicosyl-9-phosphabicyclo[3.3.1]nonane.
[2] Mixture of octamethylene-P,P'-bis(9-phosphabicyclo[4.2.1]nonane), octamethylene-P,P'-bis(9-phosphabicyclo[3.3.1]nonane), and octamethylene - P - (9 - phosphabicyclo[4.2.1]nonane) - P' - (9-phosphabicyclo[3.3.1]nonane).

EXAMPLE IV 1-dodecene was hydroformylated in the manner described in Example III by reaction with carbon monoxide and hydrogen in a $H_2$/CO mole ratio of 2:1 and a KOH/cobalt mole ratio of 0.75:1, at 163–165° C., a pressure of 1200 p.s.i.g., with a contact time of 9.5 hours in the presence of a catalyst consisting of a mixture of 9-phenyl-9 - phosphabicyclo[4.2.1]nonane - cobalt-carbonyl and 9-phenyl-9-phosphabicyclo[3.3.1]nonane-cobalt-carbonyl at a phosphine/cobalt mole ratio of 1.5:1. There was obtained a conversion of 95.4% of the olefin with a selectivity to $C_{13}$ alcohols of 83.5%. Of the $C_{13}$ alcohols obtained, 87% was the linear, straight-chain n-tridecanol, the remainder branched-chain alcohols.

Similarly 1-dodecene was hydroformylated by reaction with carbon monoxide and hydrogen in a $H_2$/CO mole ratio of 2:1 and a KOH/cobalt mole ratio of 0.75:1, at 162–164° C., a pressure of 1200 p.s.i.g., with a contact time of 9.6 hours in the presence of a novel catalyst consisting of a mixture of octamethylene-P,P'-bis(9-phosphabicyclo[4.2.1]nonane) - cobalt-carbonyl, octamethylene-P,P' - bis(9 - phosphabicyclo[3.3.1]nonane) - cobalt-carbonyl, and octamethylene - P - (9 - phosphabicyclo[4.2.1]nonane)-P' - (9 - phosphabicycle[3.3.1]nonane) - cobalt-carbonyl at a phosphine/cobalt mole ratio of 1.5:1. There was obtained a conversion of the olefin of 96.2% with a selectivity to $C_{13}$ alcohols of 83.1%. Of the $C_{13}$ alcohols obtained, 91% was the linear, straight-chain n-tridecanol, the remainder branched-chain alcohols.

It is seen from the foregoing results that with the monotertiary phosphine as the phosphorus ligand of the catalyst, the predominance of the highly desirable linear straight-chain or normal alcohol over the branched-chain isomers is not so great as with novel catalyst in which the phosphorus ligand is the bicyclic heterocyclic ditertiary phosphine of the invention.

We claim as our invention:

1. The process for the direct, single-stage production of reaction products consisting predominantly of a primary alkanol which comprises reacting a monoolefinic hydrocarbon with carbon monoxide and hydrogen at a temperature between about 100° and 300° C. and superatmospheric pressure in the presence of a catalyst consisting essentially of cobalt in complex combination with carbon monoxide and at least one hydrocarbylene-bis (monophosphabicyclononane) of the formula

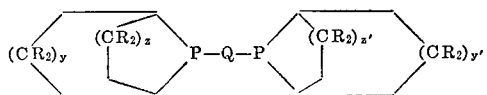

where Q represents nonacetylenic hydrocarbylene of 2 to 30 carbons; y and z represent positive integers whose sum is 3 and each of which has a minimum value of 1; $y'$ and $z'$ represent positive integers whose sum is 3 and each of which has a minimum value of 1; and R is selected from the group consisting of hydrogen and alkyl of from 1 to 4 carbon atoms such that no more than two R groups in each bicyclic system are alkyl at any one time and that each of said alkyl groups is attached to a different ring carbon.

2. The process according to claim 1 wherein the hydrocarbylene group of the hydrocarbylene-bis(monophosphabicyclononanes) is alkylene of 5 to 20 carbons.

3. The process according to claim 2 wherein the alkylene group is octamethylene and each monophosphabicyclononane is 9-phosphabicyclo[3.3.1]nonane.

4. The process according to claim 2 wherein the alkylene group is octamethylene and each monophosphabicyclononane is 9-phosphabicyclo[4.2.1]nonane.

5. The process according to claim 2 wherein the alkylene group is octamethylene and the monophosphabicyclononanes are mixtures of 9-phosphabicyclo[4.2.1]nonane and 9-phosphabicyclo[3.3.1]nonane.

References Cited

UNITED STATES PATENTS

| | | |
|---|---|---|
| 2,564,130 | 8/1951 | Schreyer. |
| 3,102,899 | 9/1963 | Cannell. |
| 3,239,569 | 3/1966 | Slaugh et al. |
| 3,420,898 | 1/1969 | Winkle et al. |

BERNARD HELFIN, Primary Examiner

J. E. EVANS, Assistant Examiner

U.S. Cl. X.R.

260—439, 491, 617, 618, 633, 635, 683.9